United States Patent Office 3,073,697
Patented Jan. 15, 1963

3,073,697
PROCESS FOR PRODUCING DOUBLE-SKELETON CATALYST ELECTRODES BY HOT-PRESSING
Karl-Hermann Friese, Eduard Justi, and August Winsel, Braunschweig, Germany, assignors, by mesne assignments, to Accumulatoren-Fabrik Aktiengesellschaft, Frankfurt am Main, Germany, and Siemens-Schuckert Werke Aktiengesellschaft, Erlangen, Germany, both German corporations
No Drawing. Filed Feb. 25, 1959, Ser. No. 795,559
Claims priority, application Germany Feb. 28, 1958
20 Claims. (Cl. 75—208)

The present invention relates to double-skeleton catalyst electrodes, and more particularly to the production of such electrodes by hot-pressing methods.

Double-skeleton catalyst electrode having high mechanical strength, high metallic, thermal and electrical conductivity are well known. These electrodes comprise a skeleton having metallic conduction, which serves as a carrier, and Raney metal granules embedded in said skeleton. Thus, for example, highly active hydrogen diffusion electrodes are obtainable by compressing a mixture consisting of a Raney alloy powder comprising 60% by weight of aluminum and 40% by weight of nickel and a carbonyl nickel powder (ratio by volume about 1:2) in molds under a pressure of from 3000 to 7000 kg./cm.$^2$ to obtain the shape desired, sintering the molded part for about 30 minutes in a reducing atmosphere at 700° C., and thereafter leaching the aluminum out of the Raney nickel alloy by means of a concentrated caustic potash solution. Hydrogen electrodes, made in this way, furnish current densities of more than 200 ma./cm.$^2$ at temperatures as low as room temperature with very low polarizations (<50 mv.).

An ideal structure for double-skeleton catalyst electrodes of this type could be realized if the Raney alloy granules were able to sinter together with the supporting skeleton granules without changing their alloy composition as a result of diffusion action. Such diffusion action is undesirable in any case, since it results in changes in the electrode structure, which are difficult to control. However, only an approximate approach to the ideal case is possible, since any sintering is always accompanied by some diffusion activity.

It is known that in effecting pressing and sintering processes simultaneously, i.e. by what is known as warm- or hot-pressing, better or at least equally good sintering results, as compared with separate pressing and sintering processes, are obtained with a lower pressure, a reduced sintering temperature and a considerably shorter sintering period. These results are believed to be due to the fact that in hot-pressing a plasticity is imparted to the powder, which is not achievable under different conditions. The literature (H. L. Strauss, The Moment of Active Deformation, Metal Progre. 51, 254–55 (1947)), refers to this as a "moment of active deformation." However, up to the present, hot-pressing has not found wide acceptance in powder metallurgy, since among other things annealing of the sintered parts is additionally necessary in most cases in order to equalize the resulting composition and structure.

It is an object of the present invention to overcome the above mentioned drawbacks and to approach more closely the ideal case of simultaneous sintering with localizing and limiting the diffusion phenomena to the sintering zones proper. These zones are actually the points of contact of the granules.

Other and further objects of the invention will become apparent from a study of the within specification.

The objects will be achieved by warm pressing, because in this case it is possible to reduce the sintering temperature and/or the sintering period while still maintaining the same degree of success in the overall sintering operation.

It has now been found, in accordance with the invention, that in producing double-skeleton catalyst electrodes, comprising an electrically conductive supporting skeleton serving as a carrier and Raney metal granules embedded therein, a diffusion of components of the Raney alloy into the supporting skeleton and a diffusion in the reverse direction is for the most part inhibited or repressed by intimately mixing the electrically conductive supporting skeleton powder with the pulverulent Raney alloy and consolidating the mixture by pressing at temperatures in excess of 100° C. The elevated temperature applied may extend throughout the entire pressed mass or be limited to the immediate proximity of the individual sintering zones of the powder particles, these sintering zones actually being the zones of electrical contact.

Thus, the pressing and sintering steps may occur simultaneously in accordance with the process of the invention. It is therefore possible by this measure to reduce the sintering temperature and sintering time considerably without lowering the mechanical strength of the formed electrodes. This reduction in sintering temperature and sintering time causes a reduction in diffusion volume, so that the electrodes produced in accordance with the invention achieve a much closer structural approximation to the above mentioned ideal electrode structure than is possible with electrodes prepared by conventional cold-pressing and sintering operations.

It is preferable in the hot-pressing operation in accordance with the invention to omit any reduction in pressure, as compared with such pressure reductions employed in conventional methods of manufacture, to obtain a reduction in the sintering temperature and/or sintering time. It is generally possible in this respect, in accordance with the invention, to decrease the sintering temperature by more than 300° C. and to shorten the sintering period by from ten to one-hundred-fold without decreasing the pressure.

The heating of the material to be pressed may be effected before and/or during the molding operation. The supply of heat for heating the material may be effected by either heating the mold, which serves as heat capacity and/or the ram. The heating of the several parts mentioned above may furthermore be carried out by built in furnaces and/or by heat radiation and/or induction. Another possibility is to heat the mass being pressed during the molding operation directly by induction means.

The closest approach to said ideal double-skeleton catalyst electrode structure may be obtained by passing a direct and/or alternating current of suitable intensity through the mass being pressed. In this way, due to the heat produced by the electric current at the points of contact with the particles, the temperature is established at these points within micro-seconds. Therefore, the elevated temperature employed during the compression step is limited to the immediate proximity of the sintering zones at these points of electrical contact of the particles. Accordingly, the temperature prevailing in the sintering zones, is higher than that in the interior of the particles, but need not reach the melting temperatures, or even softening temperatures, of the metals and alloys involved.

Thus, under the simultaneous action of pressure and sufficient elevated temperature, the individual powder particles will sinter together. This sintering will take place even though the granules are coated with layers of foreign substances, e.g. oxide layers, since these layers will be favorably either broken or damaged under the friction action of the pressing power at the contact areas or fritted by the current.

The amount of current density, required in accordance with the invention, is dependent upon the specific resistances, the particle sizes of the powders involved, the pressing power, the compression period and the hardness of the particles. Frequently, current impulses of from $10^{-3}$ to 1 second are sufficient, since the temperature is established in the contact areas in a matter of microseconds. The sintering progress advantageously can be followed by measuring the change of the total resistance of the part being pressed during the molding process.

The production of double-skeleton catalyst electrodes by hot-pressing, in accordance with the invention, may be suitably carried out under an inert atmosphere, preferably nitrogen, or under a reducing atmosphere, preferably $H_2$. A reducing atmosphere may also be obtained by incorporating metal hydrides, preferably alkali hydrides, such as sodium or potassium hydride, into the double-skeleton catalyst electrode pulverulent starting mixture. The metal hydrides must be of a type, which undergoes decomposition into the particular metal and $H_2$ below the sintering temperature. A reducing atmosphere is frequently required in those cases where a higher molding temperature is necessary (above 500° C.). Nevertheless, the production of double-skeleton catalyst electrodes in accordance with the process of the invention may be effected in the presence of atmospheric air. This is particularly true where the elevated temperature is substantially locally limited to the sintering zones proper.

The molding pressure is preferably from 1000 to 4000 kg./cm.$^2$, while the temperature is dependent upon the materials to be molded. For producing double-skeleton catalyst electrodes, which contain Raney nickel, molding temperatures of from 300 to 800° C. may be preferably used. The same temperature range is suitable for the production of double-skeleton electrodes, which contain Raney silver. If these electrodes have a supporting skeleton of nickel, the preferred temperature may be about 450° C. Double-skeleton electrodes, containing Raney copper, may be molded at temperatures of from 200 to 800° C. and preferably at about 350° C.

A further advantage of the warm- and hot-pressed double-skeleton catalyst electrodes of the invention resides in their dimensional stability, since machining after molding is unnecessary.

Finally, the instant warm- or hot-pressing process permits the production of double-skeleton catalyst electrodes having characteristics, which could only be achieved by conventional separate pressing and sintering processes with extreme difficulty, if at all. This especially is true where, at the sintering temperature required, highly exothermic chemical reactions occur between the Raney alloy and the supporting skeleton or where one or several liquid phases are encountered, which result in undesirable and detrimental diffusion action between the Raney alloy and the supporting skeleton.

These difficulties are avoided by hot-pressing in accordance with the invention, since the molding temperature required is about 200 to 300° C. lower than the sintering temperature required for separate pressing and sintering processes.

The following examples are given to illustrate the invention, and it is to be understood that the invention is not to be limited thereby.

*Example 1*

The powder of a Raney alloy, comprising 50% by weight Ni and 50% by weight Al, was thoroughly mixed with carbonyl nickel powder in a ratio of 1:1.5 by weight in a mixing drum. The particle size of the Raney alloy powder was between 5 and 8 microns and that of the carbonyl nickel powder was about 5 microns. The mixture of powders was filled into a mold so as to be uniformly distributed between the bottom mold face and the top mold face. The mold apparatus, including the faces which were ready for operation, was heated to 450° C. on a hot plate. The heat capacity of the mold was adjusted sufficiently high so that, immediately upon heating, the material being pressed was consolidated to form the electrode shape desired, using a molding pressure of 4000 kg./cm.$^2$, a temperature of 450° C. and a molding period of 1 minute. Cooling of the mold was effected by means of cooling water. An inert or reducing atmosphere was unnecessary.

*Example 2*

The same mixture of powders as in Example 1 was molded by the process of Example 1, except that the heating of the material being molded to 450° C. was effected by a resistance furnace, installed in the mold. Heating was effected before and during the molding cycle of 1 minute. The top and bottom faces were provided with a thermally insulating layer on the top and bottom, respectively.

*Example 3*

The same mixture of powders as in Example 1 was used. The upper and lower faces were electrically insulated from the powder, which was uniformly distributed in the cavity therebetween by an interposed layer of oil-impregnated paper. During the molding cycle of 2 minutes, a direct current having a current density of 500 amps./cm.$^2$ was passed through the part being molded. The molding pressure was 2000 kg./cm.$^2$.

*Example 4*

The starting alloy was a Raney silver alloy, composed of 65% by weight Ag and 35% by weight Al. A powder of this alloy was thoroughly mixed with carbonyl nickel in a ratio of 1:1.5 by weight. The particle sizes of both powders were the same as those stated in Example 1. The mixture of powders was molded to the electrode shape desired by the process described in Example 1, using a temperature of 450° C. and a pressure of 4000 kg./cm.$^2$.

The production of the Ag double-skeleton catalyst electrode of this example with a sufficiently close approach to the said ideal electrode structure is only rendered possible in accordance with the process of the invention. In separate molding and sintering processes, a sintering temperature of 600° C. or more would be required. However, since the Raney silver alloy of this example forms a liquid phase at 558° C., serious, undesirable diffusion (most likely Al diffusion into the Ni-supporting skeleton) would occur during the sintering process. At the same time, an objectionable highly exothermic reaction would occur between the Ni-supporting skeleton and the Al.

*Example 5*

The starting alloy was a Raney copper alloy, composed of 50% by weight Cu and 50% by weight Al. A powder of this alloy was intimately mixed with an electrolytically produced copper powder in a ratio of 1:1.5 by weight.

The mixture of powders was molded to form an electrode of the shape desired by the process described in Example 1, using a pressure of 4000 kg./cm.$^2$ and a temperature of 350° C.

What is claimed is:

1. A process for the production of improved catalyst electrodes having an electrically conductive supporting skeleton serving as a carrier and Raney metal granules embedded in said skeleton, which comprises intimately mixing a powder material for the electrically conductive supporting skeleton with a pulverulent Raney alloy and consolidating the mixture by compression at a pressure within the range of from about 1,000 to 7,000 kg./cm.$^2$ and heating at temperatures in excess of 100° C. but below that at which a liquid phase is formed in the electrode material for a period of at most about 2 minutes.

2. A process according to claim 1, wherein said mixture is heated at temperatures in excess of 100° C. but below that at which a liquid phase is formed in the electrode material before compressing.

3. A process according to claim 1, wherein said mixture is heated at temperatures in excess of 100° C. but below that at which a liquid phase is formed in the electrode material before and during the compressing.

4. A process according to claim 1, wherein the heating is carried out by induction heating.

5. A process according to claim 1, wherein the heating is carried out by electric current, having a density of at least 100 amps./cm.$^2$, flowing through the mass being molded for a period of $10^{-3}$ to 1 second, whereby only the immediate proximity of the points of contact of the individual particles is heated.

6. A process according to claim 1, wherein the consolidating step is carried out in an inert atmosphere.

7. A process according to claim 1, wherein the consolidating step is carried out in a reducing atmosphere.

8. A process according to claim 1, wherein the consolidating step is carried out in a normal atmosphere of air.

9. A process according to claim 7, wherein said reducing atmosphere is produced during the consolidating step by thermal decomposition of a pulverulent metal hydride admixed with the mass being consolidated at a temperature below the heating temperature to form metal and hydrogen.

10. A process according to claim 1, wherein the Raney alloy contains Raney nickel, the temperature is within the range of from 300 to 800° C. and the compressing is carried out at a pressure within the range of from 1000 to 4000 kg./cm.$^2$.

11. A process according to claim 1, wherein the Raney alloy contains Raney silver, the temperature is within the range of from 300 to 800° C. and the compressing is carried out at a pressure within the range of from 1000 to 4000 kg./cm.$^2$.

12. A process according to claim 11, wherein the powder material for the supporting skeleton is nickel and the temperature is about 450° C.

13. A process according to claim 1, wherein the Raney alloy contains Raney copper, the temperature is within the range of from 200 to 800° C. and the compressing is carried out at a pressure within the range of from 1000 to 4000 kg./cm.$^2$.

14. A process according to claim 1, wherein the Raney alloy powder contains 50% nickel and 50% aluminum by weight and is mixed with carbonyl nickel powder as the skeleton powder.

15. A process according to claim 1, wherein said alloy powder is mixed with said skeleton powder in the ratio of 1:1.5 by weight.

16. A process according to claim 1, wherein the alloy powder contains 65% silver and 35% aluminum by weight and is mixed with carbonyl nickel powder as the skeleton powder.

17. A process according to claim 1, wherein the alloy powder contains 50% each of copper and aluminum by weight and is mixed with copper powder as the skeleton powder.

18. In the process for the production of improved double-skeleton catalyst electrodes having an electrically conductive supporting skeleton serving as a carrier and Raney metal granules embedded in said skeleton, the improvement which comprises hot-compressing at a pressure within the range of from about 1000 to 7000 kg./cm.$^2$ an intimate mixture of a metal powder material for the electrically conductive supporting skeleton with a pulverulent Raney alloy material heated to a temperature above 100° C. and below that at which a continuous liquid phase is formed in the mixture for a period of between about $10^{-3}$ seconds and 2 minutes.

19. A process according to claim 18, wherein only the points of contact between the mixture particles are heated by electrical resistance.

20. A process according to claim 1, wherein the compressing is carried out at a pressure within the range of from about 1000 to 4000 kg./cm.$^2$.

References Cited in the file of this patent

UNITED STATES PATENTS

| | | |
|---|---|---|
| 2,149,596 | Gillett et al. | Mar. 7, 1939 |
| 2,393,130 | Toulmin | Jan. 15, 1946 |
| 2,833,847 | Salauze | May 6, 1958 |